(12) United States Patent
Kumashikar et al.

(10) Patent No.: US 12,525,980 B2
(45) Date of Patent: Jan. 13, 2026

(54) SYSTEMS AND METHODS FOR DYNAMIC POWER AND THERMAL MANAGEMENT FOR PROGRAMMABLE LOGIC DEVICES

(71) Applicant: Intel Corporation, Santa Clara, CA (US)

(72) Inventors: Mahesh K. Kumashikar, Bangalore (IN); Ankireddy Nalamalpu, Portland, OR (US); Atul Maheshwari, Portland, OR (US); Lai Guan Tang, Tanjung Bungah (MY)

(73) Assignee: Altera Corporation, San Jose, CA (US)

( * ) Notice: Subject to any disclaimer, the term of this patent is extended or adjusted under 35 U.S.C. 154(b) by 693 days.

(21) Appl. No.: 17/711,795

(22) Filed: Apr. 1, 2022

(65) Prior Publication Data

US 2022/0294455 A1    Sep. 15, 2022

(51) Int. Cl.
*H03K 19/17784* (2020.01)
*G06F 1/20* (2006.01)
*H03K 19/17728* (2020.01)
*H03K 19/1776* (2020.01)

(52) U.S. Cl.
CPC ....... *H03K 19/17784* (2013.01); *G06F 1/206* (2013.01); *H03K 19/17728* (2013.01); *H03K 19/1776* (2013.01)

(58) Field of Classification Search
CPC ....... H03K 19/17784; H03K 19/17728; H03K 19/1776; H03K 19/17748; H03K 19/17752; G06F 1/206; G06F 1/3206; G06F 1/324; G06F 1/3296; Y02D 10/00
See application file for complete search history.

(56) References Cited

U.S. PATENT DOCUMENTS

| 10,833,679 | B2 | 11/2020 | Clark et al. | |
| 2012/0151235 | A1* | 6/2012 | Nasrullah | G06F 1/3206 |
| | | | | 713/323 |
| 2016/0049941 | A1 | 2/2016 | How et al. | |
| 2019/0041923 | A1* | 2/2019 | Atsatt | H01L 23/5383 |

* cited by examiner

*Primary Examiner* — Daniel D Chang
(74) *Attorney, Agent, or Firm* — Fletcher Yoder, P.C.

(57) ABSTRACT

Systems or methods of the present disclosure may provide a programmable logic device including one or more power monitors and one or more thermal sensors. The programmable logic device may include control circuitry that may receive power data and thermal data for multiple die of the programmable logic device, and may implement one or more response based on the thermal and power data.

30 Claims, 11 Drawing Sheets

SYSTEMS AND METHODS FOR DYNAMIC POWER AND THERMAL MANAGEMENT FOR PROGRAMMABLE LOGIC DEVICES

BACKGROUND

The present disclosure relates generally to dynamic thermal and power management for programmable logic devices. More particularly, the present disclosure relates adjusting components of one or more die within a programmable fabric-based package (e.g., field-programmable gate array (FPGA) package) based on power data and/or thermal data collected by power monitors and thermal sensors of die within the package.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

An integrated circuit device that contains a programmable logic fabric may include multiple die connected using packaging that includes side-by-side interfaces, 2.5-dimensional (2.5D) interfaces, and/or three-dimensional (3-D) interfaces. In traditional programmable fabric-based packages, static control of thermal levels and power usage is implemented. This may result in multiple die within the package operating at different power states, and may result in excess power usage without benefit across the programmable fabric-based package. Additionally, it may result in worst case scenario power management of the package, since the power states of the one or more die within the package may not be able to be adjusted dynamically in response to power and thermal fluctuations across the one or more die of the programmable fabric-based package.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
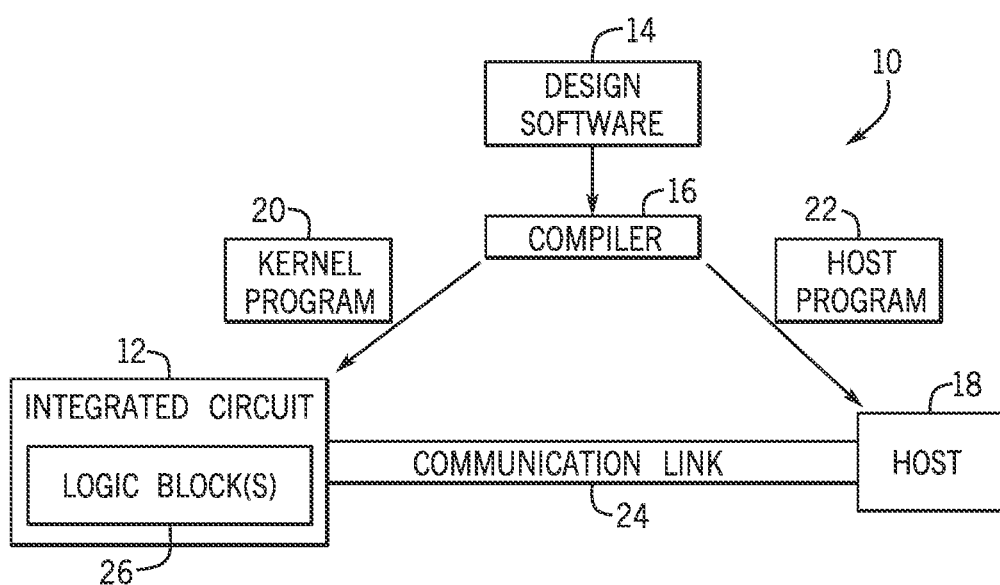
FIG. 1 is a block diagram of a system used to program an integrated circuit device, in accordance with an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present systems and techniques relate to systems and methods of implementing dynamic power and thermal management in programmable fabric-based packages that include one or more die connected using 2-D, 2.5D, and/or 3-D interfaces. The dynamic power and thermal management for the package may be facilitated through use of control circuitry that receives power data and thermal data from one or more power monitors and one or more thermal sensors located within one or more die of the programmable fabric-based package. Based on the power state and thermal level of each die, determined via the control circuitry, the die voltage and frequency of at least some of the die may be altered to increase performance or lower power usage based on the power states and thermal levels of the multiple die. The power adjustment may be implemented via voltage regulators or other power adjustment methods. For example, the power state of the input output (IO) tiles (e.g., chiplets) of one or more die within the programmable fabric-based package may be determined based on the number of IO lanes in active mode and/or sleep mode within the IO tile. The power state of the IO tiles may be determined by the control circuitry based on data collected by the one or more power monitors within the IO tiles. Additionally, accelerator tiles located on one or more die may have different power states based on the phase of the accelerator tile (e.g., compute phase, memory phase). Based on the power and/or thermal level of the die and tiles (e.g., chiplets) determined by power data and/or thermal data collected by one or more power monitors and thermal sensors of the die, the programmable fabric package may implement one or more control responses via control circuitry located within the programmable fabric die or within a separate die of the programmable fabric package.

In other words, the programmable fabric die may adjust operating conditions based on power usage and thermal level of one or more die within the programmable fabric-based package. Control circuitry external to and/or within the programmable fabric-based package may receive power data and thermal data and perform calculations using software and/or firmware to determine whether the power usage and/or thermal levels of each die within the programmable fabric-based package exceeds one or more power and/or thermal threshold levels. The control circuitry may then send instructions to implement certain actions to one or more die within the package based on the determined power usage and thermal level. For example, the programmable fabric voltage and/or frequency may be adjusted based on if the power usage and/or thermal level exceeds the threshold power and thermal threshold levels designated for the package. For example, the programmable fabric die may lower the voltages of sectors near the periphery of the programmable fabric to correspond to the detected bandwidth of the IO tiles and/or the accelerator compute state. The tile die-to-die (D2D) interfaces and the logic within the programmable fabric die may adapt to changes in power states of the multiple die by modulating frequency of the programmable fabric die. In other embodiments, if the power state is detected as corresponding to power headroom, the control circuitry may send a communication to increase the voltage and frequency of compute tiles within the programmable fabric die.

In other embodiments, one or more programmable fabric die may be able to communicate thermal and power levels between programmable fabric die. This communication of power and thermal levels between the programmable fabric die enables the programmable fabric die to detect hotspots on certain programmable fabric die, and trigger logic reconfiguration to distribute the hotspot to a different programmable fabric die. In this way, the logic of the programmable fabric die may be reconfigured to transfer hotspots from one programmable fabric die to another programmable fabric die.

With the foregoing in mind, FIG. 1 illustrates a block diagram of a system 10 that may implement arithmetic operations. A designer may desire to implement functionality, such as the operations of this disclosure, on an integrated circuit device 12 (e.g., a programmable logic device, such as a field programmable gate array (FPGA) or an application specific integrated circuit (ASIC)). In some cases, the designer may specify a high-level program to be implemented, such as an OPENCL® program, which may enable the designer to more efficiently and easily provide programming instructions to configure a set of programmable logic cells for the integrated circuit device 12 without specific knowledge of low-level hardware description languages (e.g., Verilog or VHDL). For example, since OPENCL® is quite similar to other high-level programming languages, such as C++, designers of programmable logic familiar with such programming languages may have a reduced learning curve than designers that are required to learn unfamiliar low-level hardware description languages to implement new functionalities in the integrated circuit device 12.

The designer may implement high-level designs using design software 14, such as a version of INTEL® QUARTUS® by INTEL CORPORATION. The design software 14 may use a compiler 16 to convert the high-level program into a lower-level description. In some embodiments, the compiler 16 and the design software 14 may be packaged into a single software application. The compiler 16 may provide machine-readable instructions representative of the high-level program to a host 18 and the integrated circuit device 12. The host 18 may receive a host program 22 which may be implemented by the kernel programs 20. To implement the host program 22, the host 18 may communicate instructions from the host program 22 to the integrated circuit device 12 via a communications link 24, which may be, for example, direct memory access (DMA) communications or peripheral component interconnect express (PCIe) communications. In some embodiments, the kernel programs 20 and the host 18 may enable configuration of a logic block 26 on the integrated circuit device 12. The logic block 26 may include circuitry and/or other logic elements and may be configured to implement arithmetic operations, such as addition and multiplication.

The designer may use the design software 14 to generate and/or to specify a low-level program, such as the low-level hardware description languages described above. Further, in some embodiments, the system 10 may be implemented without a separate host program 22. Moreover, in some embodiments, the techniques described herein may be implemented in circuitry as a non-programmable circuit design. Thus, embodiments described herein are intended to be illustrative and not limiting.

Figure 2:
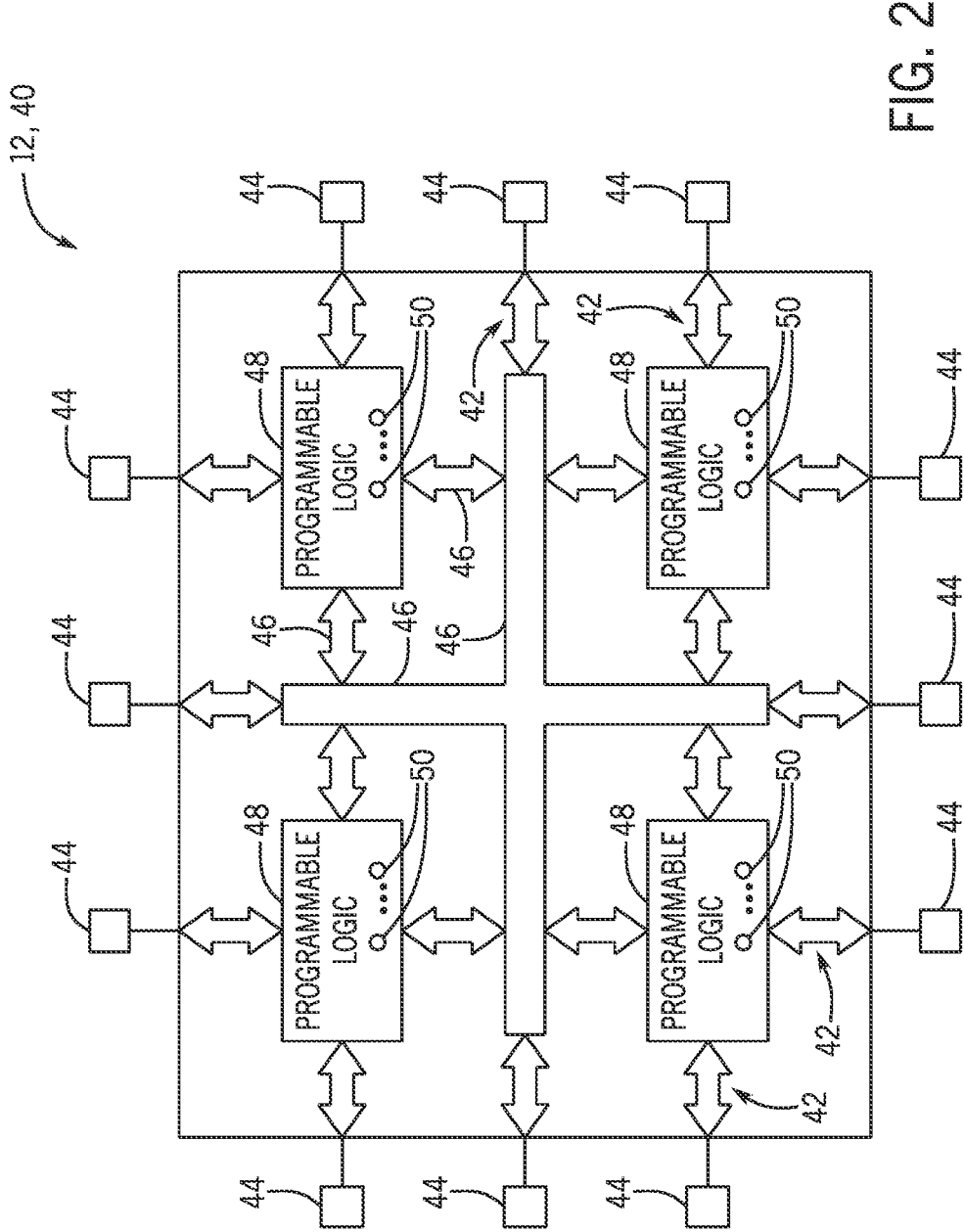
FIG. 2 is a block diagram of the integrated circuit device of FIG. 1, in accordance with an embodiment of the present disclosure.

Turning now to a more detailed discussion of the integrated circuit device 12, FIG. 2 is a block diagram of an example of the integrated circuit device 12 as a programmable logic device, such as a field-programmable gate array (FPGA). Further, it should be understood that the integrated circuit device 12 may be any other suitable type of programmable logic device (e.g., an ASIC and/or application-specific standard product). The integrated circuit device 12 may have input/output circuitry 42 for driving signals off device and for receiving signals from other devices via input/output pins 44. Interconnection resources 46, such as global and local vertical and horizontal conductive lines and buses, and/or configuration resources (e.g., hardwired couplings, logical couplings not implemented by user logic), may be used to route signals on integrated circuit device 12. Additionally, interconnection resources 46 may include fixed interconnects (conductive lines) and programmable interconnects (i.e., programmable connections between respective fixed interconnects). Programmable logic 48 may include combinational and sequential logic circuitry. For example, programmable logic 48 may include look-up tables, registers, and multiplexers. In various embodiments, the programmable logic 48 may be configured to perform a custom logic function. The programmable interconnects associated with interconnection resources may be considered to be a part of programmable logic 48.

Programmable logic devices, such as the integrated circuit device 12, may include programmable elements 50 with the programmable logic 48. In some embodiments, at least some of the programmable elements 50 may be grouped into logic array blocks (LAB s). As discussed above, a designer (e.g., a customer) may (re)program (e.g., (re)configure) the programmable logic 48 to perform one or more desired functions. By way of example, some programmable logic devices may be programmed or reprogrammed by configuring programmable elements 50 using mask programming arrangements, which is performed during semiconductor manufacturing. Other programmable logic devices are configured after semiconductor fabrication operations have been completed, such as by using electrical programming or laser programming to program programmable elements 50. In general, programmable elements 50 may be based on any suitable programmable technology, such as fuses, antifuses, electrically programmable read-only-memory technology, random-access memory cells, mask-programmed elements, and so forth.

Many programmable logic devices are electrically programmed. With electrical programming arrangements, the programmable elements 50 may be formed from one or more memory cells. For example, during programming, configuration data is loaded into the memory cells using input/output pins 44 and input/output circuitry 42. In one embodiment, the memory cells may be implemented as random-access-memory (RAM) cells. The use of memory cells based on RAM technology as described herein is intended to be only one example. Further, since these RAM cells are loaded with configuration data during programming, they are sometimes referred to as configuration RAM cells (CRAM). These memory cells may each provide a corresponding static control output signal that controls the state of an associated logic component in programmable logic 48. For instance, in some embodiments, the output signals may be applied to the gates of metal-oxide-semiconductor (MOS) transistors within the programmable logic 48.

Figure 3:
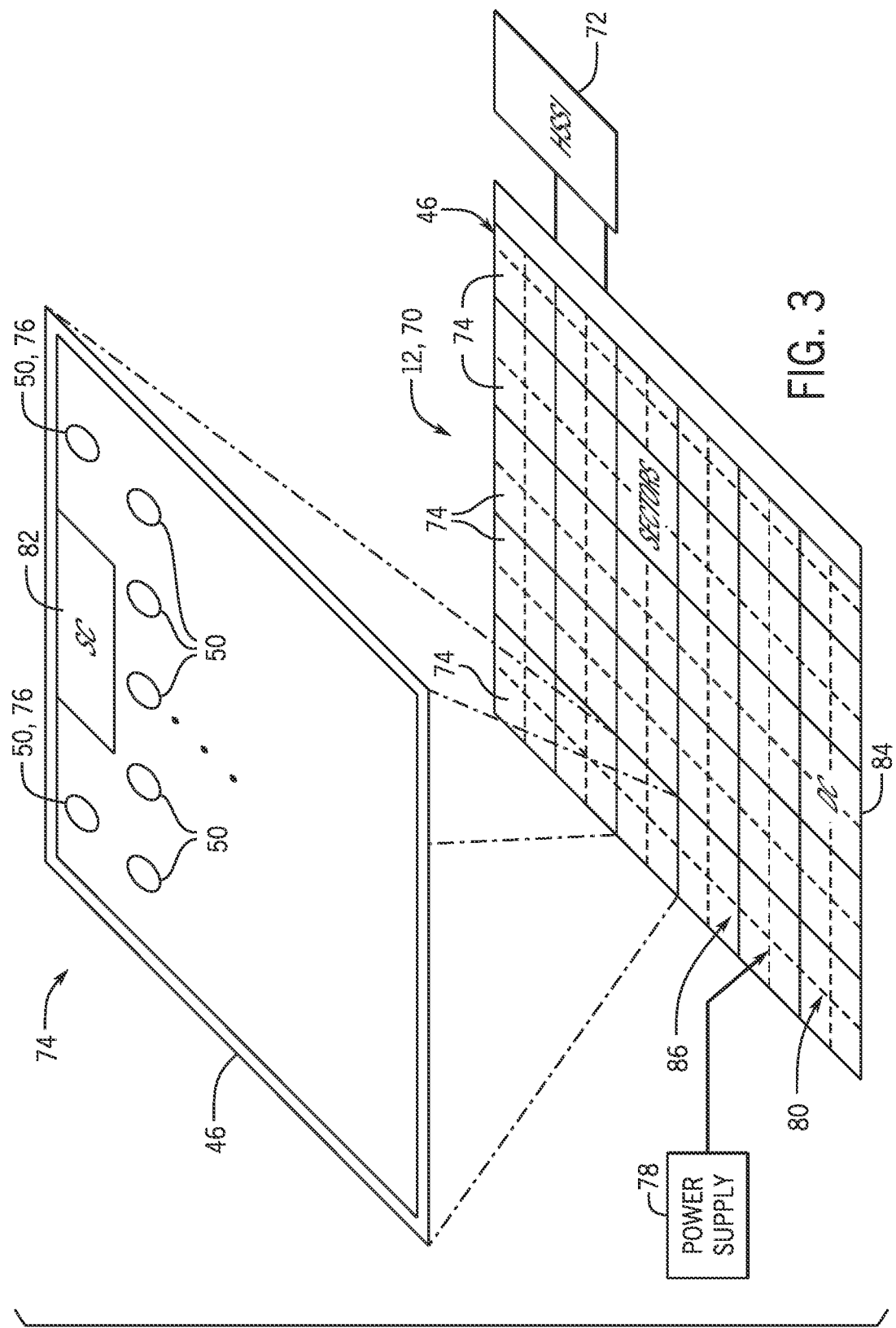
FIG. 3 is a diagram of programmable fabric of the integrated circuit device of FIG. 1, in accordance with an embodiment of the present disclosure.

The integrated circuit device 12 may include any programmable logic device such as a field programmable gate array (FPGA) 70, as shown in FIG. 3. For the purposes of this example, the FPGA 70 is referred to as an FPGA, though it should be understood that the device may be any suitable type of programmable logic device (e.g., an application-specific integrated circuit and/r application-specific standard product). In one example, the FPGA 70 is a sectorized FPGA of the type described in U.S. Patent Publication No. 2016/0049941, "Programmable Circuit Having Multiple Sectors," which is incorporated by reference in its entirety for all purposes. The FPGA 70 may be formed on a single plane. Additionally or alternatively, the FPGA 70 may be a three-dimensional FPGA having a base die and a fabric die of the type described in U.S. Pat. No. 10,833,679, "Multi-Purpose Interface for Configuration Data and User Fabric Data," which is incorporated by reference in its entirety for all purposes.

In the example of FIG. 3, the FPGA 70 may include transceiver 72 that may include and/or use input/output circuitry, such as input/output circuitry 42 in FIG. 2, for driving signals off the FPGA 70 and for receiving signals from other devices. Interconnection resources 46 may be used to route signals, such as clock or data signals, through the FPGA 70. The FPGA 70 is sectorized, meaning that programmable logic resources may be distributed through a number of discrete programmable logic sectors 74. Programmable logic sectors 74 may include a number of programmable logic elements 50 having operations defined by configuration memory 76 (e.g., CRAM).

A power supply 78 may provide a source of voltage (e.g., supply voltage) and current to a power distribution network (PDN) 80 that distributes electrical power to the various components of the FPGA 70. Operating the circuitry of the FPGA 70 causes power to be drawn from the power distribution network 80.

There may be any suitable number of programmable logic sectors 74 on the FPGA 70. Indeed, while 29 programmable logic sectors 74 are shown here, it should be appreciated that more or fewer may appear in an actual implementation (e.g., in some cases, on the order of 50, 100, 500, 1000, 5000, 10,000, 50,000 or 100,000 sectors or more). Programmable logic sectors 74 may include a sector controller (SC) 82 that controls operation of the programmable logic sector 74. Sector controllers 82 may be in communication with a device controller (DC) 84.

Sector controllers 82 may accept commands and data from the device controller 84 and may read data from and write data into its configuration memory 76 based on control signals from the device controller 84. In addition to these operations, the sector controller 82 may be augmented with numerous additional capabilities. For example, such capabilities may include locally sequencing reads and writes to implement error detection and correction on the configuration memory 76 and sequencing test control signals to effect various test modes.

The sector controllers 82 and the device controller 84 may be implemented as state machines and/or processors. For example, operations of the sector controllers 82 or the device controller 84 may be implemented as a separate routine in a memory containing a control program. This control program memory may be fixed in a read-only memory (ROM) or stored in a writable memory, such as random-access memory (RAM). The ROM may have a size larger than would be used to store only one copy of each routine. This may allow routines to have multiple variants depending on "modes" the local controller may be placed into. When the control program memory is implemented as RAM, the RAM may be written with new routines to implement new operations and functionality into the programmable logic sectors 74. This may provide usable extensibility in an efficient and easily understood way. This may be useful because new commands could bring about large amounts of local activity within the sector at the expense of only a small amount of communication between the device controller 84 and the sector controllers 82.

Sector controllers 82 thus may communicate with the device controller 84, which may coordinate the operations of the sector controllers 82 and convey commands initiated from outside the FPGA 70. To support this communication, the interconnection resources 46 may act as a network between the device controller 84 and sector controllers 82. The interconnection resources 46 may support a wide variety of signals between the device controller 84 and sector controllers 82. In one example, these signals may be transmitted as communication packets.

The use of configuration memory 76 based on RAM technology as described herein is intended to be only one example. Moreover, configuration memory 76 may be distributed (e.g., as RAM cells) throughout the various programmable logic sectors 74 of the FPGA 70. The configuration memory 76 may provide a corresponding static control output signal that controls the state of an associated programmable logic element 50 or programmable component of the interconnection resources 46. The output signals of the configuration memory 76 may be applied to the gates of metal-oxide-semiconductor (MOS) transistors that control the states of the programmable logic elements 50 or programmable components of the interconnection resources 46.

As discussed above, some embodiments of the programmable logic fabric may be included in programmable fabric-based packages that include multiple die connected using, 2-D, 2.5-D, or 3-D interfaces. Each of the die may include logic and/or tiles that correspond to a power state and thermal level. Additionally, the power usage and thermal level of each die within the package may be monitored, and control circuitry may dynamically control operations of the one or more die based on the power data and thermal data collected.

Figure 4:
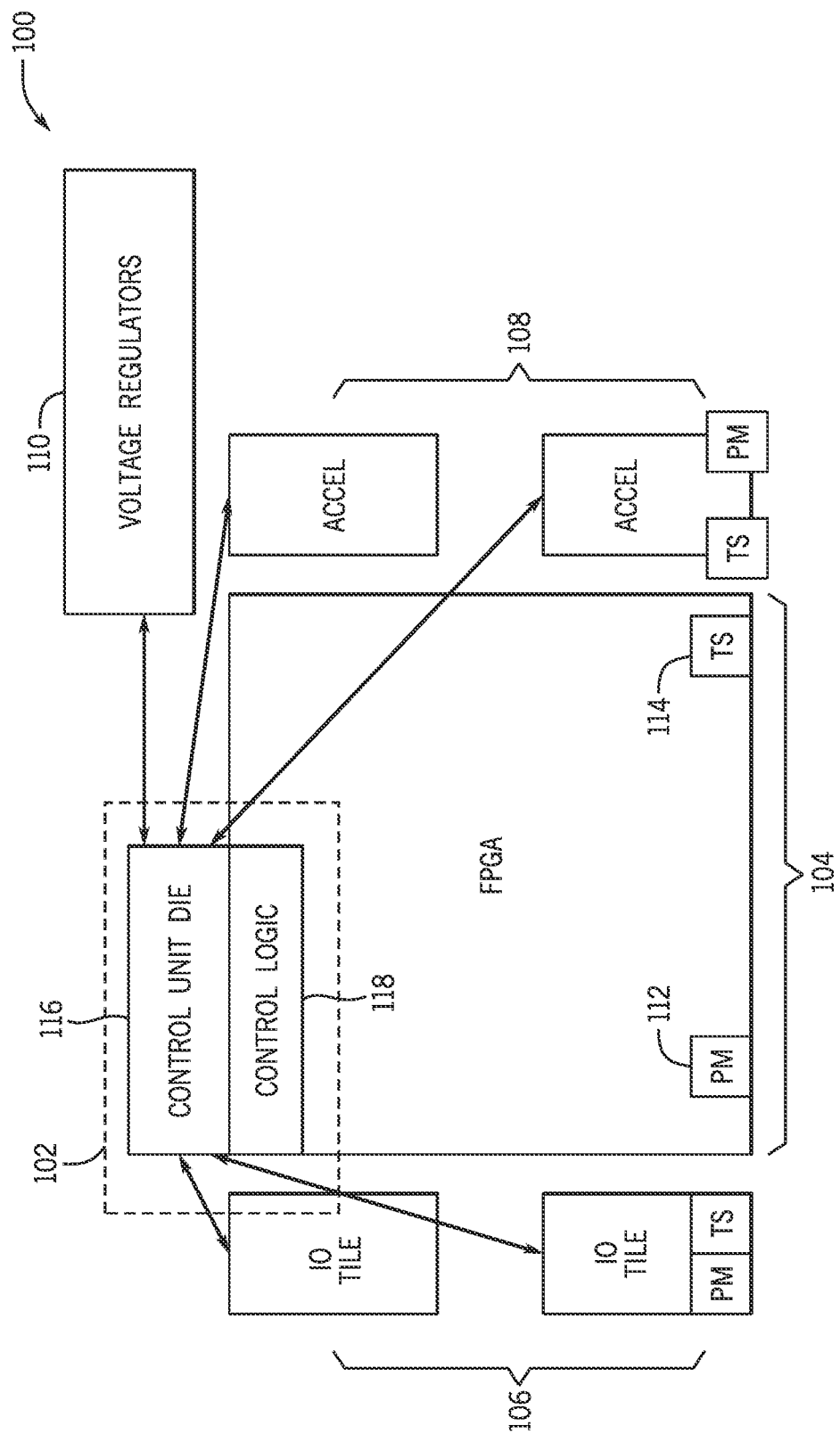
FIG. 4 is a block diagram of multiple die within a programmable fabric-based package that includes control circuitry to implement active power and thermal management, in accordance with an embodiment of the present disclosure.

With the foregoing in mind, FIG. 4 is a block diagram of multiple die within a programmable fabric-based package 100 with control circuitry 102 to implement active power management, in accordance with an embodiment of the present disclosure. The programmable fabric-based package 100 may include one or more die connected via 2-D, 2.5-D, or 3-D interfaces. The programmable fabric-based package 100 may include programmable fabric die 104, IO tiles 106, accelerator tiles 108, the control circuitry 102, and voltage regulators 110. Based on the detected power state, power usage, and/or thermal level data of one or more die collected via power monitors 112 and/or thermal sensors 114 located on the die, one or more power state responses (e.g., alter operating points, alter voltage and/or frequency) may be implemented in one or more die via the control circuitry 102.

The control circuitry may 102 include control logic 118 located within the programmable fabric die 104 and/or other die within the package and/or may include a separate control unit die 116 die located within the programmable fabric-based package 100. The control logic 118 located within the programmable fabric die 104 may include soft control logic (e.g., software) and/or firmware that runs within the programmable fabric die 104. The control circuitry 102, which may be implemented within one or more die (e.g., the programmable fabric die 104) and/or external from the die, may receive one or more sets of thermal level data and/or power usage data from the power monitors 112 and/or the thermal sensors 114 located within the die of the programmable fabric-based package 100. The control circuitry 102 may determine response commands based on each die thermal level and/or power usage, and send signals to adjust operating parameters (e.g., voltage, frequency) of the one or more die using the voltage regulators 110 or any other suitable control logic.

The power monitors 112 may monitor the power utilized by one or more die and transmit the power data to the control circuitry 102 over time. For instance, the power monitors 112 may monitor one or more voltages and/or one or more currents within the respective die. As discussed above, the programmable fabric-based package 100 may include one or more thermal sensors 114 and one or more power monitors 112 to collect power and thermal data for the one or more die and/or tiles of the programmable fabric-based package 100. The thermal sensors 114 and the power monitors 112 may be powered by one or more voltage regulator bus that may be in communication with the voltage regulators 110 and/or the control circuitry 102. The control circuitry 102 may be implemented using a control unit die 116 separate from other die in the programmable fabric-based package 100 and/or distributed across one or more die of the programmable fabric-based package 100. The one or more voltage regulators 110 may be implemented a motherboard voltage regulator or an on-package voltage regulator. Additionally or alternatively, the one or more voltage regulators 110 may be implemented in the various die of the package. For instance, the one or more regulators 110 may include fully integrated voltage regulators (FIVRs) that are integrated into one or more die. The voltage regulators 110 may receive communications from and communicate to the control circuitry 102 to implement control responses based on power and thermal data.

As discussed above, the control circuitry 102 may determine responses based on power and thermal data collected for one or more die of the programmable fabric-based package 100. The control circuitry 102 may determine, based on the collected power data, if the power usage for the programmable fabric-based package 100 is below or above a threshold power level, and may send a signal to adjust the voltage within the programmable fabric die 104 or additional die via the voltage regulators 110 based on the power data. For example, the power monitors 112 may collect power data from the IO tiles 106 and/or the accelerator tiles 108 located within die of the programmable fabric-based package 100. The power data may be sent to the control circuitry 102, and the control circuitry 102 may determine the power state of each die within the programmable fabric package 100 based on the power data. For example, the IO tile 106 power state may be determined based on the number of lanes in active mode and/or sleep mode based on the collected power data from the power monitors 112. Additionally or alternatively, the programmable fabric die 104 may monitor bandwidth at the interface between the programmable fabric die 104 and the IO tiles 106 to estimate IO tile power in each power state. Additionally or alternatively, the accelerator tiles 108 may correspond to different power states based on compute phases and/or memory phases of the accelerator tiles 108 that may be detected based on the power data collected via power monitors 112 located on the accelerator tiles 108. The control circuitry 102 may receive power data and thermal data from the power monitors 112 and the thermal sensors 114 and determine power states of one or more die and thermal levels of one or more die. The control circuitry 102 may then determine if the power level and/or thermal level of the programmable fabric-based package 100 exceeds a one or more power thresholds or one or more thermal thresholds that correspond to responses that increase and/or decrease the power and/or thermal levels within the package. Furthermore, the control circuitry 102 may adjust operation of the programmable fabric of the programmable fabric die 104, of the IO tiles 106, and/or the accelerator tiles 108 based on states of the other components. For instance, when the throughput of the IO tiles 106/accelerator tiles 108 is reduced (e.g., more than a threshold of idle lanes), the control circuitry 102 may reduce power usage/performance to match the states of the IO tiles 106/accelerator tiles 108 or vice versa. Similarly, if the bandwidth of the IO tiles 106 and/or accelerator tiles 108 is unrestrained by states of the respective tiles, the control circuitry 102 may increase the performance of the programmable fabric if not restrained by power or thermal data. Likewise, operation of the IO tiles 106 and/or accelerator tiles 108 may be adjusted to match the states of each other and/or the programmable fabric of the programmable fabric die.

For example, the control circuitry 102 may send a signal to the voltage regulators 110 to lower voltage at the one or more programmable logic sectors 74 located at the periphery of the programmable fabric die 104, based on the detected power level of the IO tiles 106 and/or accelerator tiles 108. Additionally or alternatively, the frequency of the die may be modulated to adapt to the determined power state of the one or more die and/or tiles of the programmable fabric-based package 100. Further, the voltage and/or frequency of the compute tiles of the programmable fabric die 104 may be increased based on power headroom determined based on the power data collected via the power monitors 112 and/or a previous power reduction. It should be understood, that any suitable responses may be implemented by the control circuitry 102 to manage power usage and thermal level throughout the programmable fabric-based package 100 using the techniques discussed herein related to the control circuitry 102.

Figure 5:
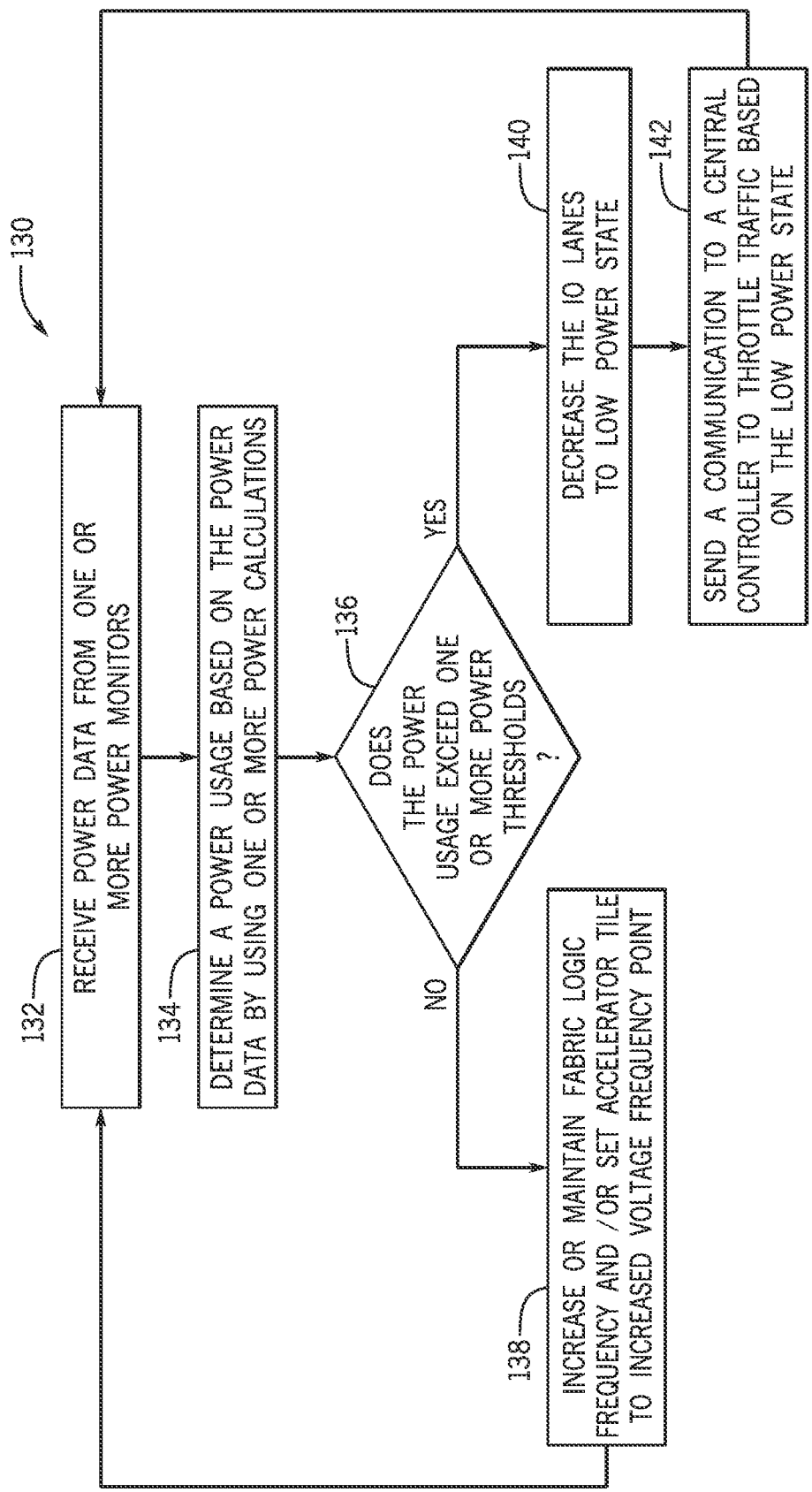
FIG. 5 is a flow diagram of a method for dynamic power management of the programmable fabric-based package, in accordance with an embodiment of the present disclosure.

With the foregoing in mind, FIG. 5 is a flow diagram of a method 130 for dynamic power control of the programmable fabric-based package 100, in accordance with an embodiment of the present disclosure. As discussed above, control circuitry 102 may be implemented within the programmable fabric-based package 100 to enable dynamic power management based on collected power sensor data from the die within the programmable fabric-based package 100. It should be understood, that the control circuitry 102 may include a centralized control unit die 116 and/or may include control logic 118 distributed throughout the programmable fabric-based package 100. For instance, the control logic 118 may be implemented by loading a configuration into the programmable fabric of the programmable fabric die 104. As such, various embodiments of the control circuitry 102 may include any suitable firmware and/or software components to perform power and/or thermal level manipulations as discussed herein.

With the foregoing in mind, the control circuitry 102, at block 132, receives power data from one or more power monitors 112 of the programmable fabric-based package 100. As previously discussed, the one or more power monitors 112 may be located within and/or interface with IO tiles 106, programmable fabric die 104, and accelerator tiles 108, or any other die and/or tiles of the package. The power data may indicate a voltage, current, or frequency used by the respective monitored die and may be used by the control circuitry 102 to implement one or more responses to manage power utilization for the programmable fabric-based package 100.

To do this, the control circuitry, at block 134, calculates the power usage of the programmable fabric-based package 100 based on the power data. The calculations performed by the control circuitry 102 may include determining a moving average of the power usage over time within the one or more die and/or tiles, determining an exponential moving average of the power usage within the one or more die and/or tiles, determining the power usage within multiple time windows corresponding to the received power data, or any other suitable power level calculations. The power level may be determined based on any of the above calculations, or by taking a weighted average of any suitable power level calculation. These calculation may be implemented by algorithms within the CPU of the control unit die 116 and/or through the control logic 118 distributed throughout one or more die. As such, the power usage may be individually computed for each component of the programmable fabric based-package 100 at a specific time, for each component of the programmable fabric based-package 100 over time (e.g., average/accumulation over time), for overall usage of the programmable fabric based-package 100 at a specific time, or may be an overall power usage of the programmable fabric based-package 100 over time (e.g., average/accumulation over time).

If the control circuitry 102 determines, at decision block 136, that the calculated power usage is above one or more power usage threshold values, the control circuitry 102 may implement one or more power management operations at block 140. The one or more power usage threshold values may be based on one or more design points that were designated for power consumption limits at manufacturing and/or based on the desired logic implemented by the programmable fabric-based package 100. The one or more power thresholds may correspond to different response instructions. For example, exceeding a lower power threshold could correspond to decreasing IO lanes within the IO tiles 106 to a lower power state, whereas exceeding a higher power threshold may correspond to complete shutdown of one or more IO lanes.

The one or more management operations performed by the control circuitry 102 at block 140, in response to exceeding the one or more power thresholds may include sending a signal to the IO tiles 106 to update IO lanes to a low power state. Additionally the control circuitry 102 may send a signal to the programmable fabric die 104 to decrease the IO interface logic frequency and send a signal to the one or more accelerator tile 108 to set a voltage frequency point based on the power usage exceeding the power usage threshold value. The control circuitry 102, at decision block 142, sends a communication to the central control logic and/or the host 18 of the programmable fabric-based package 100 to throttle communication to the programmable fabric die 104 to reduce power usage, based on the power usage exceeding the power usage threshold value. The method may then return to block 132, and the control circuitry 102 may continue to receive updated power data from the one or more power monitors 112 of the programmable fabric-based package 100.

The power adjustment may be made in any of various mechanisms. The programmable fabric die 104 power may be adjusted to match the bandwidth of the IO tiles 106 at the operating points of the IO tiles 106. Based on the power monitored at the one or more die, the control circuitry 102 may implement multiple responses. For example, the voltage level of the one or more periphery sectors of the programmable fabric die 104 located near the IO tiles 106 may be lowered via the voltage regulators 110 to correspond to the bandwidth of the IO tiles 106 and/or the compute state of the accelerator tiles 108. The tile die-to-die interface and the control logic 118 within the programmable fabric die 104 may adapt to the power state of the IO tiles 106 and/or accelerator tiles 108 by modulating the frequency of the programmable fabric die 104.

If the control circuitry 120 determines that the power usage is below one or more power thresholds, the control circuitry 102, at block 138, sends a communication to increase or maintain the programmable fabric die 104 logic frequency and/or set the accelerator tiles 108 to an increase voltage frequency point. For example, if power is reduced and/or conditions change (e.g., less congestion/more idle time), a power headroom for a die (e.g., the programmable fabric die 104) may exist. In response to determining that power headroom is available, the control circuitry 102 may send a signal to increase the voltage and/or frequency of the compute tiles in response to the power headroom for the programmable fabric base die 104 to boost performance due to the available resources. A threshold related to this power threshold after a previous power reduction may be different than the threshold used to perform the power reduction.

Figure 6:
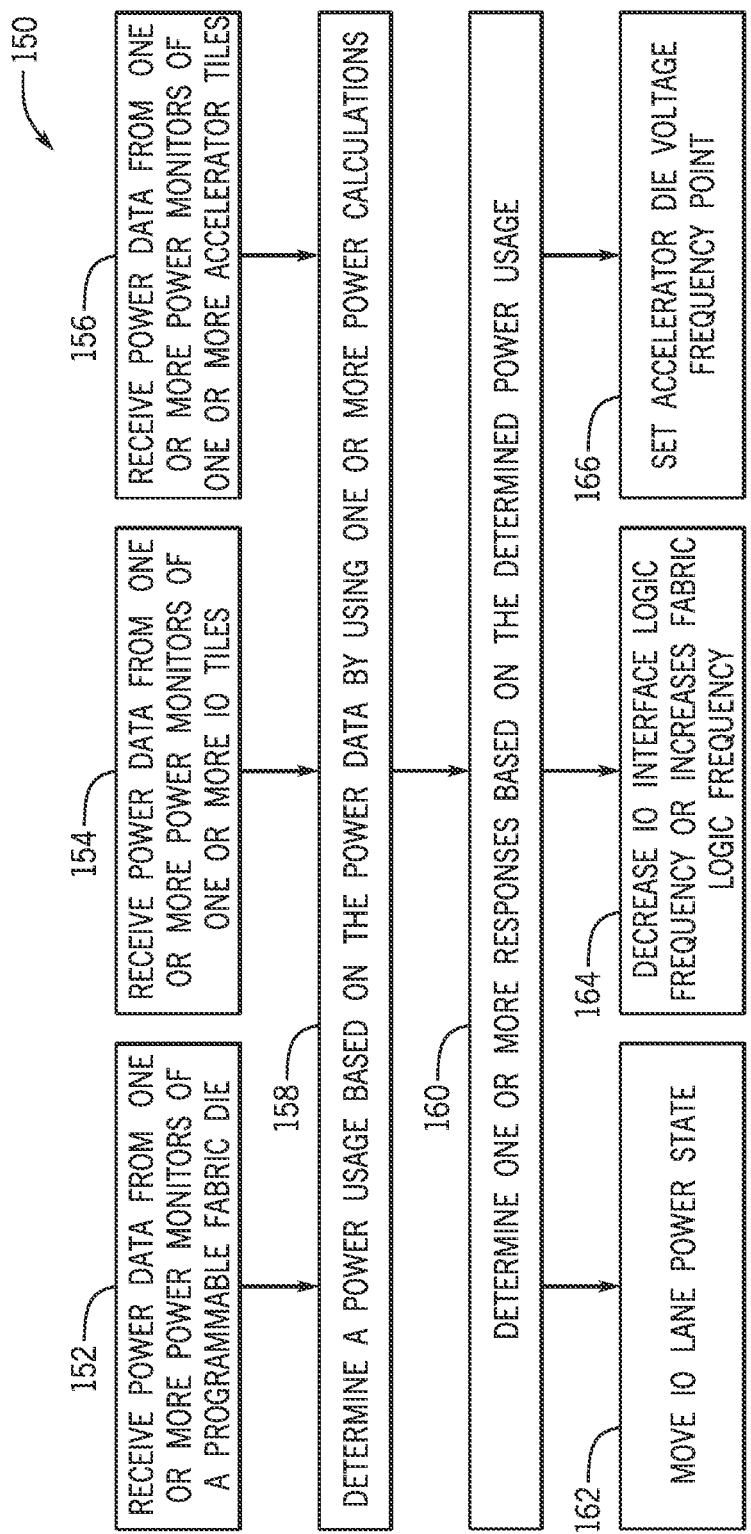
FIG. 6 is a flow diagram of a method for dynamic power management for multiple die and tile components of the programmable fabric-based package, in accordance with an embodiment of the present disclosure.

The control circuitry 102 may perform operations in response to power usage for one or more die of the programmable fabric-based package 100 based on power usage. For example, FIG. 6 is a flow diagram of a method 150 for dynamic power management for multiple die and tile components of the programmable fabric-based package 100, in accordance with an embodiment of the present disclosure.

As discussed above, control circuitry 102 may be implemented within the programmable fabric-based package 100 to enable dynamic power management based on collected power sensor data corresponding to the die within the programmable fabric-based package 100. It should be understood, that the control circuitry 102 may include a centralized control unit die 102 and/or may include control logic 118 implemented in one or more die of the programmable fabric-based package 100.

With the foregoing in mind, the control circuitry 102, at block 152, may receive power data from the power monitors 112 of the programmable fabric-based package 100. The control circuitry at block 154 may also receive power data from the power monitors 112 of the IO tiles 106, and control circuitry 102 at block 156, may receive power data from one or more monitors of the accelerator tiles 108. It should be understood, that the power monitors may be located within one or more tiles and/or one or more die of the programmable fabric-based package 100 to determine power state of all or some tiles and die of the package so that responses may be implemented to manage the power state of the programmable fabric-based package 100. The power data from any of the power monitors 112 may monitor a voltage, current, frequency, and/or other parameters related to power utilization.

To utilize this power data, the control circuitry, at block 158, calculates the power usage of the programmable fabric-based package 100 based on the received power data. As previously discussed, the calculations performed by the control circuitry 102 may include determining a moving average of the power usage over time within the one or more die and/or tiles, determining an exponential moving average of the power usage within the one or more die and/or tiles, determining the power usage within multiple time windows corresponding to the received power data, or any other suitable power level calculations. The power level may be determined based on any of the above calculations, or by taking a weighted average of any suitable power level calculation. These calculation algorithms may be implemented within the CPU of the control unit die 116 and/or through the control logic 118 distributed throughout one or more die. The power usage may be an average power usage based on the power data collected for the power usage of the programmable fabric die 104, the IO tiles 106, the accelerator tiles 108, or any other die and/or tiles corresponding to power usage for the programmable fabric-based package 100.

The control circuitry 102 determines, at decision block 160, one or more responses to implement for the die and tiles based on the calculated power usage being above or below one or more power usage threshold values, the control circuitry 102 may implement one or more power management operations at blocks 162, 164, and 166. For example, the power usage threshold value may be based on a one or more design points that were designated for power consumption at manufacturing or based on the desired logic implemented by the programmable fabric-based package 100. The one or more power thresholds may correspond to different response instructions. For example, the control circuitry 102, at block 162, sends a communication to the IO tiles 106 to move the IO lane power state based on if power usage is above or below one or more power thresholds. For example, exceeding a lower power threshold could correspond to decreasing IO lanes within the IO tiles 106 to a lower power state, whereas exceeding a higher power threshold may correspond to complete shutdown of one or more IO lanes. The control circuitry, at block 164, sends a control signal to the programmable fabric die 104 based on the calculated power usage. For example, the control circuitry 102 may send a signal to the programmable fabric die 104 to decrease the programmable fabric die 104 interface logic frequency, in response to the power usage exceeding one or more thresholds, and may send a signal to increase the interface logic frequency in response to the power usage being below one or more thresholds.

The control circuitry 102, at block 166, sends a communication to set the voltage frequency point for the accelerator tiles 108 based on the determined power usage, and whether the power usage was above or below one or more designated power thresholds. It should be understood that although one or more responses are detailed above based on the tiles and die within the programmable fabric-based package 100, the control circuitry 102 may implement any suitable control response based on the determined power usage.

Figure 7:
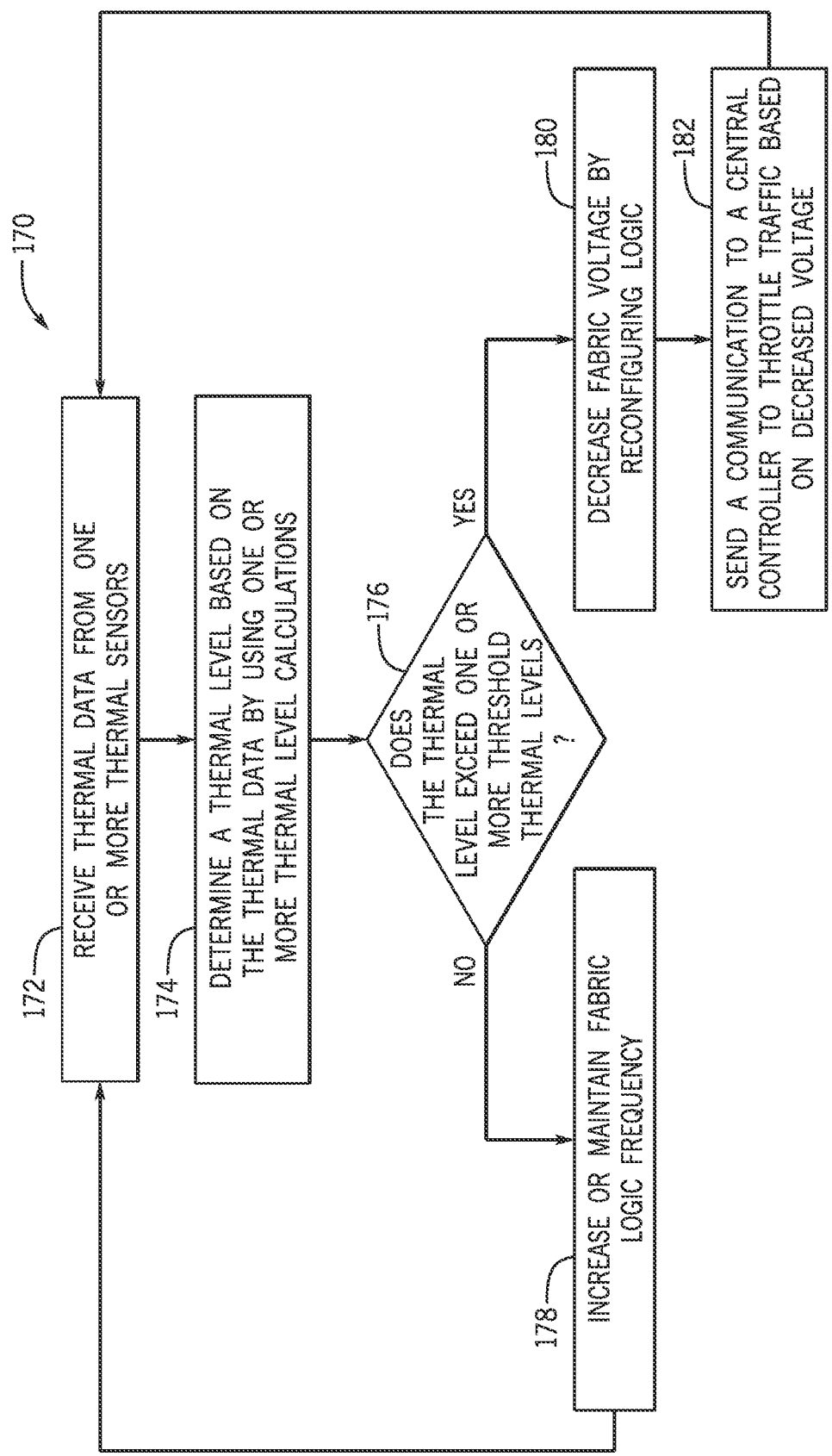
FIG. 7 is a flow diagram of a method of dynamic thermal management of the programmable fabric-based package, in accordance with an embodiment of the present disclosure.

In addition to or alternative to power management control, the control circuitry 102 may implement thermal control of the programmable fabric-based package 100, as shown in FIG. 7. FIG. 7 is a flow diagram of a method 170 of dynamic thermal management of the programmable fabric-based package 100, in accordance with an embodiment of the present disclosure. It should be understood, that the control circuitry 102 may include a centralized control unit die 116 and/or may include control logic 118 distributed throughout the programmable fabric-based package 100. For instance, the control logic 118 may be implemented by loading a configuration into the programmable fabric of the programmable fabric die 104. As such, various embodiments of the control circuitry 102 may include any suitable firmware and/or software components to perform power and/or thermal level manipulations as discussed herein.

With the foregoing in mind, the control circuitry 102, at block 172, receives thermal data from the one or more thermal sensors 114 of the programmable fabric-based package 100. The one or more thermal sensors 114 may be located within and/or interface with die and/or tiles of the programmable fabric-based package 100. The thermal data may be used by the control circuitry 102 to implement one or more control responses based on the thermal level of the programmable fabric-based package 100. The thermal sensors 114 may include one or more thermal sensors distributed across each die of the programmable fabric-based package 100 collect temperature data at one or more locations across each die. The temperature data collected by the thermal sensors 114 at one or more locations across each die may enable analysis of temperature data for hotspots (e.g., portions or sectors of die that are higher in temperature than other sectors of the same die).

To do this, the control circuitry, at block 174, calculates the thermal level of the programmable fabric-based package 100 based on the thermal data received from the one or more thermal sensors 114. The calculations performed by the control circuitry 102 may include applying one or more algorithms to determine average thermal temperature across the die of the package and algorithms to detect hotspots of each of the die within the programmable fabric-based package 100. The thermal level may be determined based on any of the above calculations, or by taking a weighted average of any suitable thermal level calculations. These calculation algorithms may be implemented within the control unit die 116 and/or through the control logic 118 implemented in one or more die of the programmable fabric-based package 100.

If the control circuitry 102 determines, at decision block 176 that the calculated thermal level is above one or more thermal level threshold values, the control circuitry 102 may implement one or more power management operations at block 180. The thermal level threshold value may be based on one or more design points that were designated for thermal level caps at manufacturing and/or based on the implementation using the programmable fabric-based package 100. The one or more thermal level thresholds may correspond to different response instructions. For example, exceeding a lower thermal threshold could correspond to decreasing the programmable fabric die 104 voltage by reconfiguring fabric logic, whereas exceeding a higher thermal threshold may correspond to a shutdown of the programmable fabric die 104 by more greatly decreasing the fabric voltage.

The one or more management operations performed by the control circuitry 102 at block 180, in response to exceeding the one or more thermal thresholds may include sending a signal to the IO die to update IO lanes to a low power state and/or shutdown depending on thermal threshold value that was exceeded. Additionally the control circuitry 102 may send a signal to the programmable fabric die 104 to decrease the IO interface logic voltage, current, and/or frequency and may reconfigure the fabric logic to distribute thermal levels. Further, the control circuitry 102 may send a signal to the one or more accelerator tiles 108 to set a decrease voltage (or current or frequency) and/or shutdown based on the thermal level exceeding one or more thermal level values. The control circuitry 102, at decision block 182, sends a communication to the central control logic of the programmable fabric-based package 100 and/or the host 18 to throttle communication to the programmable fabric die 104 to reduce thermal level, based on the thermal level exceeding the one or more thermal level threshold values. The method may then return to block 172, and the control circuitry 102 may continue to receive updated thermal data from the one or more thermal sensors 114 of the programmable fabric-based package 100.

If the control circuitry 120 determines that the thermal level is below one or more thermal level thresholds, the control circuitry 102, at block 178, may send a communication to increase and/or maintain the programmable fabric die 104 logic frequency due to the thermal headroom. This is especially true if thermal restraints had been used to previously reduce performance. Additionally or alternatively, the increase to utilize thermal headroom may be used if bottlenecking or other factors indicate that an increase in performance may be beneficial.

Figure 8:
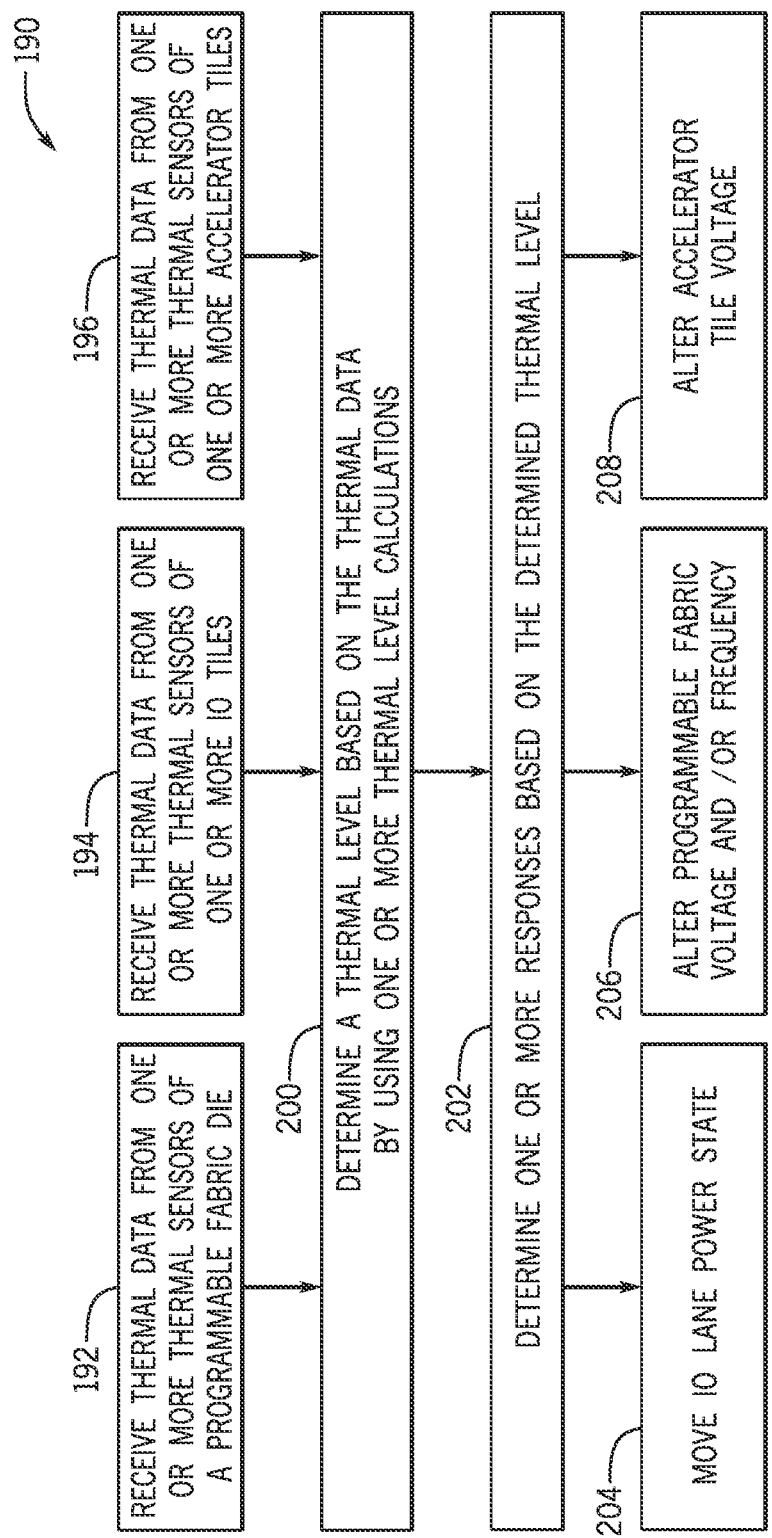
FIG. 8 is a flow diagram of a method for dynamic thermal management for multiple die and tile components of the programmable fabric-based package, in accordance with an embodiment of the present disclosure.

With the foregoing in mind, FIG. 8 is a flow diagram of a method 190 for dynamic thermal management for multiple die and tile components of the programmable fabric-based package 100, in accordance with an embodiment of the present disclosure. It should be understood, that the control circuitry 102 may include a centralized control unit die 116 and/or may include control logic 118 distributed throughout the programmable fabric-based package 100. For instance, the control logic 118 may be implemented by loading a configuration into the programmable fabric of the programmable fabric die 104. As such, various embodiments of the control circuitry 102 may include any suitable firmware and/or software components to perform power and/or thermal level manipulations as discussed herein.

With the foregoing in mind, the control circuitry 102, at block 192, receives thermal data from one or more thermal sensors 114 of the programmable fabric die 104. The thermal sensors may be distributed at one or more locations across the programmable fabric die 104, and the thermal data may include thermal level data for one or more locations (e.g., sectors) across the programmable fabric-based package. The control circuitry at block 194 may also receive thermal data from one or more thermal sensors 114 of the IO tiles 106, and control circuitry 102 at block 196, may also receive thermal data from one or more thermal sensors 114 of the accelerator tiles 108. It should be understood, that the thermal sensor 114 programmable fabric-based package may be used to determine a thermal profile for all or some tiles and die of the package or the package overall. This thermal profile may be used to manage the power usage of and resultant heat generation in the programmable fabric-based package 100.

To do this, the control circuitry, at block 200, calculates the thermal level of the programmable fabric-based package 100 based on the thermal data received from the one or more thermal sensors 114. The calculations performed by the control circuitry may include applying one or more algorithms to determine average thermal temperature across the die of the package and/or to detect hotspots of the die within the programmable fabric-based package 100. The thermal level may be determined based on any of the above calculations, or by taking a weighted average of any suitable thermal level calculation. These calculation algorithms may be implemented within the control unit die 116 and/or in the control logic 118 distributed throughout one or more die (e.g., the programmable fabric die 104).

The control circuitry 102 determines, at decision block 202, one or more control responses to implement for the die and tiles of the programmable fabric-based package 100 based on the calculated thermal level being above or below one or more thermal level threshold values. The control circuitry 102 may implement one or more thermal management operations at blocks 204, 206, and 208. For example, the thermal level threshold value may be based on one or more design points that were designated for thermal levels at manufacturing or based on the desired logic implemented by the programmable fabric-based package 100. The one or more thermal thresholds may correspond to different response instructions. The one or more thermal thresholds may correspond to different response instructions and/or may be different based on whether performance is being increased or reduced. For instance, a thermal threshold corresponding reduction in performance may have a higher temperature level before transitioning from a first level to a second level. When returning to the first level, a different and lower thermal threshold may be used to wait until additional cooling has occurred before switching back to the first level.

For example, the control circuitry 102, at block 204, sends a communication to the IO tiles 106 to move the IO lane power state based on if thermal level is above or below one or more power thresholds. The control circuitry, at block 164, sends a control signal to the programmable fabric die 104 based on the calculated thermal level. For example, the control circuitry 102 may send a signal to the programmable fabric die 104 to decrease the programmable fabric die 104 interface logic frequency and/or voltage, in response to the thermal level exceeding one or more thresholds, and may send a signal to the control logic 118 of the programmable fabric die 104 to reconfigure logic based on detected hotspots based on the thermal level data, and reconfigure the logic within the hotspots to other locations across the die to enable more efficient heat distribution.

The control circuitry 102, at block 208, sends a communication to set the voltage for the accelerator tiles 108 based on the determined thermal level, based on whether the thermal level was above or below one or more designated thermal level thresholds. It should be understood that although one or more responses are detailed above based on the tiles and die within the programmable fabric-based package 100, the control circuitry 102 may implement any suitable control response based on the determined power usage.

The programmable fabric-based package may also manage thermal level of the programmable fabric-based package 100, by offloading one or more hotspots on a programmable fabric die to another programmable fabric die within the package. The programmable fabric-based package 100 may also include one or more thermal controllers that may detect one or more hotspots within the programmable fabric-based package 100 and reconfigure the programmable fabric die to move the hotspot from one programmable fabric die to another programmable fabric die based on thermal levels using multiple logic configurations stored within the CRAM of each of the programmable fabric die. For instance, the thermal sensors 114 and the control circuitry 102 may be used to determine when to make a change while working with the programmable fabric die to perform the changes.

Figure 9:
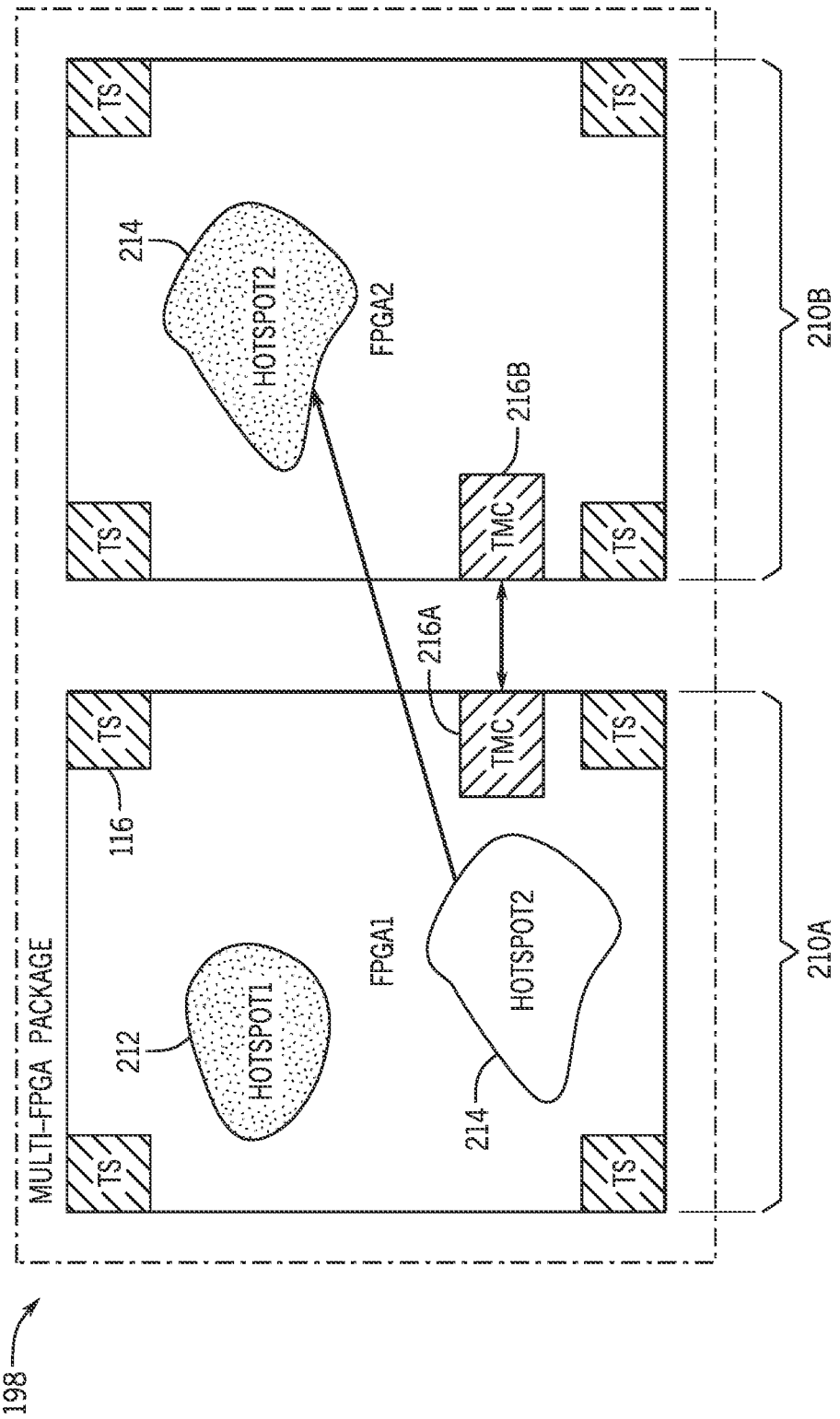
FIG. 9 is a block diagram of thermal control in multiple programmable fabrics in a two-dimensional configuration, in accordance with an embodiment of the present disclosure.

Keeping the foregoing in mind, FIG. 9 is a block diagram of thermal control in multiple programmable fabrics in a two-dimensional (2-D) programmable fabric based-packaged 198, in accordance with an embodiment of the present disclosure. As discussed above, a first programmable fabric die 210A of the 2-D programmable fabric-based package 198 may communicate thermal data with a second programmable fabric die 210B of the 2-D programmable fabric-based package 198 to reconfigure logic corresponding to hotspots 214 from the first programmable fabric die 210A to another the second adjacent programmable fabric die 210B. This may enable more even heat distribution across the programmable fabric-based package 100. Additionally or alternatively, one of the programmable fabric die 210 may be more capable of dissipating heat more quickly than the other. In such embodiments, the control circuitry 102 may prioritize moving hotspots to the more die having more rapid head dissipation. The transfer of hotspots 212, 214 from one of the first programmable fabric die 210A to another enables thermal hotspot management, using a control unit die 116 and/or control logic 118 implemented at least one die of the 2-D programmable fabric-based package 198.

To detect the hotspots 212, 214, one or more thermal sensors 114 may be distributed throughout one or more programmable fabric die 210A, 210B of the package 198. The one or more thermal sensors 114 may be placed at the periphery of the programmable fabric die 210, internally within the programmable fabric die 210, or any other suitable location within the programmable fabric die 210. The programmable fabric die 210A, 210B may also include a thermal management controllers 216A, 216B that may detect run-time hotspots (e.g., area of fabric die where a thermal level exceeds a threshold thermal level value), and communicate thermal levels and hotspot data to another thermal management controller 216A, 216B, so that hotspots may be transferred between the programmable fabric die 210A, 210B based on the thermal level data. The thermal management controllers 216A, 216B of the die may communicate with a secure device manager to determine logic corresponding to hotspots, and facilitate reconfiguration of logic corresponding to hotspots between the programmable fabric die 210A, 210B.

Through detection of thermal hotspots 212, 214 and reconfiguration of the programmable fabric(s) to move the thermal hotspots to enable more efficient thermal dissipation across one or more programmable fabric die, thermal management for the two-dimensional (2-D) programmable fabric-based package 100 is implemented. One or more reconfiguration blocks may be included in the programmable fabric die 210A, 210B, and may include predefined functions that include multiple configurations stored in the CRAM that can be reconfigured by control logic 118 based on detected thermal hotspots 212, 214 within the programmable fabric die 210A, 210B to relocate thermal hotspots across the programmable fabric die 210A, 210B to distribute thermal levels efficiently throughout the 2-D programmable fabric-based package 198. programmable fabric-based package Additionally, one or more high speed receivers may be located along the shoreline of the memory interface of each programmable fabric die 210A, 210B within the 2-D programmable fabric-based package 198. The workload of each programmable fabric die may 210A, 210B be transferred between the memory and transceiver interface within the thermal profile of each programmable fabric die 210A, 210B. To transfer hotspots between programmable fabric die 210A, 210B, configurations of programmable elements may be reconfigured from one programmable fabric die to another programmable fabric die.

For example, the first programmable fabric die 210A may collect thermal data for multiple locations across the die via the thermal sensors 114, and the thermal sensors may send the collected thermal data to the first thermal management controller 216A. The first thermal management controllers 216A and/or 216B may determine the thermal levels across the first programmable fabric die 210A (e.g., via control circuitry 102). The control circuitry 102 and/or the management controller 216A may identify a first hotspot 212 and a second hotspot 214 in the first programmable fabric die 210A based on the thermal data. The control circuitry 102 and/or the management controller 216A may determine the thermal levels for the area corresponding to the hotspot exceeding a threshold value. For instance, the first thermal management controller 216A may determine and send the hotspot data for the second hotspot 214 to the second thermal management controller 216B of the second programmable fabric die 210B. Alternatively, the control circuitry 102 may make such determinations independently. Likewise, the thermal management controller 210A and/or the control circuitry 102 may determine which logic blocks are in the area of the hotspot 214 that may be distributed to the second programmable fabric die 210B. For instance, the thermal management controller 210A, the control circuitry 102, and/or a secure device manager (SDM) may determine that the hotspot 214 is part of a function module/block that includes logic blocks outside of the hotspot 214. To distribute the overall thermal level across the 2-D programmable fabric-based package 198, the function module/block may be moved. The second thermal management controller 216B may receive the thermal hotspot information from the first controller thermal management controller 216A and reconfigure logic using the SDM (e.g., configuration manager) to identify logic within the hotspots 212, 214 and relocate the logic corresponding to the second hotspot 214 of the first programmable fabric die 210A to the second programmable fabric die 210B. The logic blocks in the area of the detected second thermal hotspot 214 may be moved to the second programmable fabric die 210B by loading a configuration corresponding to the function module/block to logic blocks of the second programmable fabric die 210B. This enables distribution of thermal levels across the programmable fabric-based package to reduce hotspot concentration in one area. It should be understood that although two programmable fabric die 210A, 210B are depicted in this embodiment, any suitable number of programmable fabric die may be used to distribute hotspots throughout the 2-D programmable fabric-based package 198. Furthermore, when reconfiguring programmable fabric die, the reconfiguration may be completed using a partial reconfiguration and/or full reconfiguration with a restart of the programmable fabric die.

Figure 10:
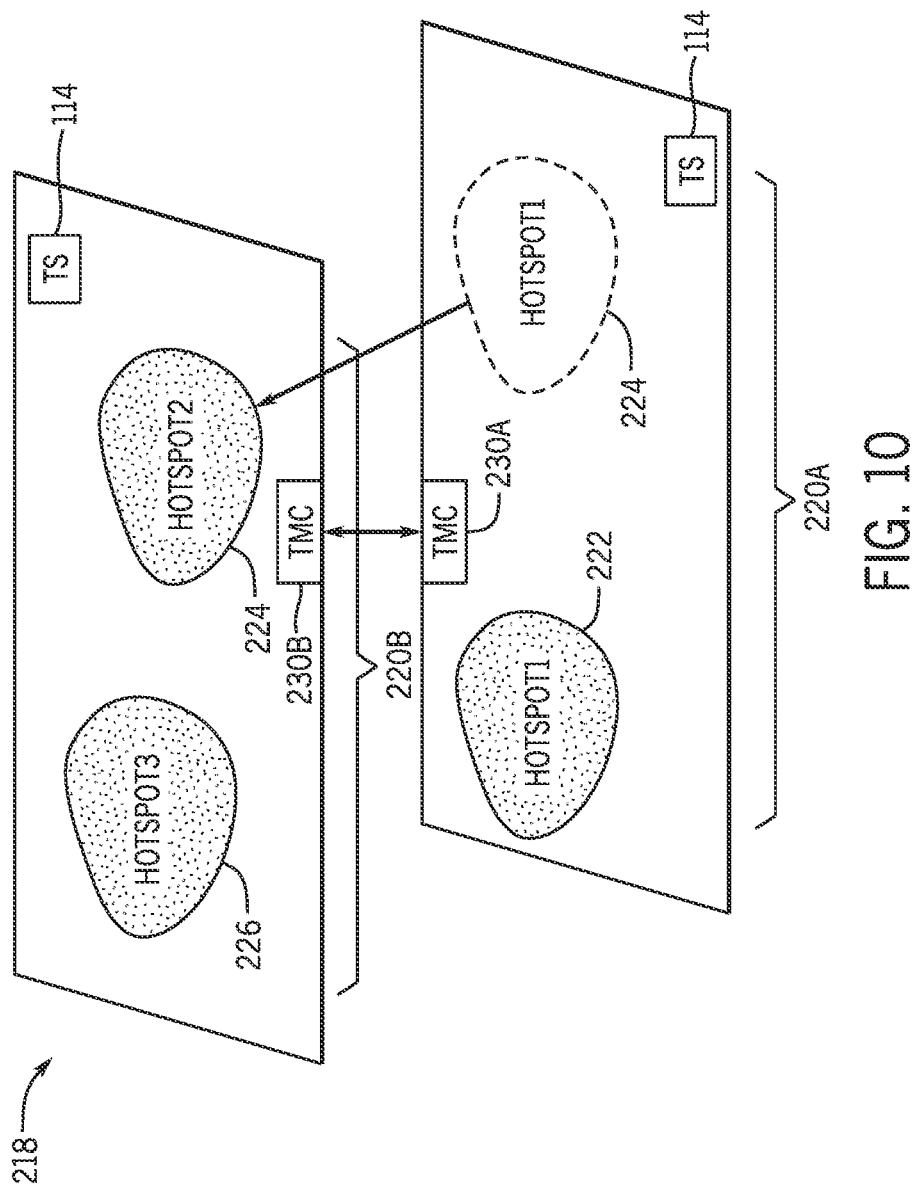
FIG. 10 is a block diagram of thermal control in multiple programmable fabrics in a three-dimensional configuration, in accordance with an embodiment of the present disclosure.
Figure 11:
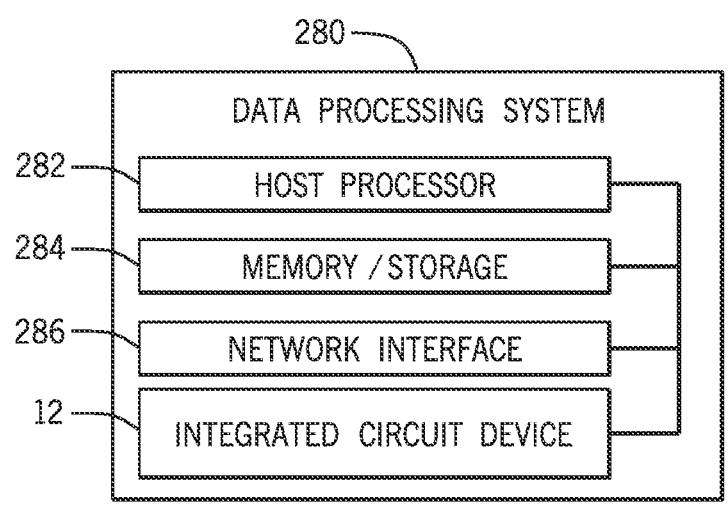
FIG. 11 is a block diagram of a data processing system, in accordance with an embodiment of the present disclosure.

In some embodiments, the same thermal distribution methods may be applied to three-dimensional (3-D) programmable fabric based-packages 218. For example, FIG. 10 is a block diagram of thermal management in multiple programmable fabrics in a three-dimensional configuration, in accordance with an embodiment of the present disclosure. A bottom programmable fabric die 220A of the 3-D programmable fabric-based package 218 may communicate thermal data with a top programmable fabric die 220B of the package to transfer hotspots from the bottom programmable fabric die 220A to another programmable fabric die 220B stacked in a three-dimensional configuration on top of the bottom programmable fabric die 220A. This may enable more even heat distribution across the 3-D programmable fabric-based package 218. For instance, the top programmable fabric die 220B may have better heat dissipation and may have the hotspot 224 moved there accordingly.

To detect the hotspots 222, 224, 226, one or more thermal sensors 114 may be distributed throughout one or more programmable fabric die 220A, 220B of the package 218. The one or more thermal sensors 114 may be placed at the periphery of the programmable fabric die 220, internally within the programmable fabric die 220, or any other suitable location within the programmable fabric die 230. The programmable fabric die 220A, 220B may also include a thermal management controllers 230A, 230B that may detect run-time hotspots (e.g., area of fabric die where a thermal level exceeds a threshold thermal level value), and communicate thermal levels and hotspot data to another thermal management controller 230A, 230B, so that hotspots may be transferred between the programmable fabric die 230A, 230B based on the thermal level data. The thermal management controllers 230A, 230B of the die may communicate with a secure device manager to determine logic corresponding to hotspots, and facilitate reconfiguration of logic corresponding to hotspots between the programmable fabric die 220A, 220B.

Through detection of thermal hotspots 222, 224, 226 and reconfiguration of the programmable fabric(s) to move the thermal hotspots to enable more efficient thermal dissipation across one or more programmable fabric die, thermal management for the three-dimensional (3-D) programmable fabric-based package 100 is implemented. One or more reconfiguration blocks may be included in the programmable fabric die 220A, 220B, and may include predefined functions that include multiple configurations stored in the CRAM that can be reconfigured by control logic 118 based on detected thermal hotspots 222, 224, 226 within the programmable fabric die 220A, 220B to relocate thermal hotspots across the programmable fabric die 220A, 220B to distribute thermal levels efficiently throughout the 3-D programmable fabric-based package 218 programmable fabric-based package, and reconfigure hotspots to one or top die of the programmable fabric-based package 218 to aide in heat dissipation.

Additionally, one or more high speed receivers may be located along the shoreline of the memory interface of each programmable fabric die 220A, 220B within the 3-D programmable fabric-based package 218. The workload of each programmable fabric die may 220A, 220B be transferred between the memory and transceiver interface within the thermal profile of each programmable fabric die 220A, 220B. To transfer hotspots between programmable fabric die 220A, 220B, configurations of programmable elements may be reconfigured from one programmable fabric die to another programmable fabric die.

For example, the bottom programmable fabric die 220A may collect thermal data for multiple locations across the die via the thermal sensors 114, and the thermal sensors 114 may send the collected thermal data to the bottom thermal management controller 230A. The first thermal management controllers 230A and/or 230B may determine the thermal levels across the bottom programmable fabric die 220A (e.g., via control circuitry 102). The control circuitry 102 and/or the management controller 230A may identify a first hotspot 222 and a second hotspot 224 in the bottom programmable fabric die 220A based on the thermal data. Additionally, the control circuitry and/or management controller 230B may identify a third hotspot 226 in the top programmable fabric die 220B based on the thermal data. The control circuitry 102 and/or the bottom management controller 230A may determine the thermal levels for the area corresponding to the hotspot exceeding a threshold value. For instance, the bottom thermal management controller 230A may determine and send the hotspot data for the second hotspot 224 to the top thermal management controller 230B of the top programmable fabric die 220A. Alternatively, the control circuitry 102 may make such determinations independently. Likewise, the bottom thermal management controller 230A and/or the control circuitry 102 may determine which logic blocks are in the area of the hotspot 224 that may be distributed to the top programmable fabric die 220A. For instance, the bottom thermal management controller 230A, the control circuitry 102, and/or a secure device manager (SDM) may determine that the hotspot 224 is part of a function module/block that includes logic blocks outside of the hotspot 224. To distribute the overall thermal level across the 3-D programmable fabric-based package 218, the function module/block may be moved. The top thermal management controller 230B may receive the thermal hotspot information from the bottom thermal management controller 230A and reconfigure logic using the SDM (e.g., configuration manager) to identify logic within the hotspots 222, 224, 226 and relocate the logic corresponding to the second hotspot 224 of the bottom programmable fabric die 220A to the top programmable fabric die 220B. The logic blocks in the area of the detected second thermal hotspot 224 may be moved to the top programmable fabric die 220B by loading a configuration corresponding to the function module/block to logic blocks of the top programmable fabric die 220B. This enables distribution of thermal levels across the programmable fabric-based package to reduce hotspot concentration in one area.

It should be understood that although two programmable fabric die three-dimensionally stacked are depicted in this embodiment, any suitable number of programmable fabric die may be used to distribute hotspots throughout the programmable fabric-based package 100. It should be understood, that the programmable fabric-based package 100 may have any suitable data processing system to use for processing of information and to complete the power and thermal management methods described above.

The integrated circuit device 12 may be a data processing system or a component included in a data processing system. For example, the integrated circuit device 12 may be a component of a data processing system 280 shown in FIG.

11. The data processing system 280 may include a host processor 282 (e.g., a central-processing unit (CPU)), memory and/or storage circuitry 284, and a network interface 286. The data processing system 280 may include more or fewer components (e.g., electronic display, user interface structures, application specific integrated circuits (ASICs)). The host processor 282 may include any suitable processor, such as an INTEL® Xeon® processor or a reduced-instruction processor (e.g., a reduced instruction set computer (RISC), an Advanced RISC Machine (ARM) processor) that may manage a data processing request for the data processing system 280 (e.g., to perform debugging, data analysis, encryption, decryption, machine learning, video processing, voice recognition, image recognition, data compression, database search ranking, bioinformatics, network security pattern identification, spatial navigation, or the like). The memory and/or storage circuitry 284 may include random access memory (RAM), read-only memory (ROM), one or more hard drives, flash memory, or the like. The memory and/or storage circuitry 284 may hold data to be processed by the data processing system 280. In some cases, the memory and/or storage circuitry 284 may also store configuration programs (bitstreams) for programming the integrated circuit device 12. The network interface 286 may allow the data processing system 280 to communicate with other electronic devices. The data processing system 280 may include several different packages or may be contained within a single package on a single package substrate.

In one example, the data processing system 280 may be part of a data center that processes a variety of different requests. For instance, the data processing system 280 may receive a data processing request via the network interface 286 to perform acceleration, debugging, error detection, data analysis, encryption, decryption, machine learning, video processing, voice recognition, image recognition, data compression, database search ranking, bioinformatics, network security pattern identification, spatial navigation, digital signal processing, or some other specialized tasks.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

EXAMPLE EMBODIMENTS

Example Embodiment 1

A programmable logic device package comprising: one or more voltage regulators; one or more power sensors to measure a power parameter; one or more interconnected fabric die; and control circuitry to: receive power data from the one or more power sensors located on the one or more interconnected fabric die; and send instructions to the one or more voltage regulators to control power levels of the programmable logic device package based on the power data.

Example Embodiment 2

The programmable logic device package of example embodiment 1, wherein the one or more interconnected fabric die comprise one or more input/output (IO) chiplets Example Embodiment 3

The programmable logic device package of example embodiment 2, wherein the control circuitry determines a power state of the one or more IO chiplets, wherein determining the power state comprises determining a number of IO lanes in an active mode, a number of IO lanes in a sleep mode, or numbers of IO lanes in both active modes and in sleep modes.

Example Embodiment 4

The programmable logic device package of example embodiment 2, wherein the control circuitry determines a power state of the one or more IO chiplets based on bandwidth data based at least in part on the received power data.

Example Embodiment 5

The programmable logic device package of example embodiment 1, wherein the instructions comprise instructions to set one or more sectors of the one or more interconnected fabric die to a lower voltage state based on a determined available bandwidth of one or more IO chiplets of the programmable logic device package, one or more compute states of one or more accelerator chiplets of the programmable logic device, or both.

Example Embodiment 6

The programmable logic device package of example embodiment 1, wherein the control circuitry comprises a control unit die that is coupled to the one or more interconnected fabric die and the one or more voltage regulators.

Example Embodiment 7

The programmable logic device package of example embodiment 1, wherein the control circuitry comprises control logic implemented in a programmable logic fabric on at least one of the one or more interconnected fabric die.

Example Embodiment 8

The programmable logic device package of example embodiment 1, wherein the one or more interconnected fabric die comprise one or more accelerator chiplets.

Example Embodiment 9

The programmable logic device package of example embodiment 1, wherein the control circuitry determines an average power level of the power parameter over time based on the power data.

Example Embodiment 10

The programmable logic device package of example embodiment 9, wherein the control circuitry determines whether the average power level over time exceeds one or more power thresholds and sends the instructions based at least in part on the average power level exceeding the one or more power thresholds.

Example Embodiment 11

The programmable logic device package of example embodiment 1, wherein the power parameter comprises a measured current, a measured voltage, or a combination thereof.

Example Embodiment 12

A programmable logic device package comprising one or more voltage regulators; one or more power sensors to measure a power parameter; one or more interconnected fabric die; an accelerator chiplet to aid the one or more interconnected fabric die in performing operations; and control circuitry to: receive power data from the one or more power sensors located on the one or more interconnected fabric die; determine an average power level based on the received power data; determine the average power level exceeds one or more threshold values; and send instructions to the one or more voltage regulators of the programmable logic to control power levels of the accelerator die based on the power data.

Example Embodiment 13

The programmable logic device package of example embodiment 12, wherein the power data comprises a power parameter of the programmable logic die power data, IO chiplet power data, accelerator chiplet power data for the accelerator chiplet, or any combination thereof.

Example Embodiment 14

The programmable logic device package of example embodiment 12, wherein the instructions comprise instructions to move one or more IO lanes of one or more IO chiplets of the one or more interconnected fabric die to a low power state.

Example Embodiment 15

The programmable logic device package of example embodiment 12, wherein the instructions comprise instructions to decrease an interface frequency of the one or more interconnected fabric die.

Example Embodiment 16

The programmable logic device package of example embodiment 12, wherein the instructions comprise instructions to lower a voltage frequency point of the accelerator chiplet.

Example Embodiment 17

The programmable logic device package of example embodiment 12, wherein the control circuitry comprises a control unit die that is coupled to the one or more interconnected fabric die and the one or more voltage regulators.

Example Embodiment 18

A programmable logic device package comprising: one or more voltage regulators; one or more thermal sensors to measure a thermal parameter; one or more interconnected fabric die; and control circuitry to: determine a thermal level based on received thermal data; determine the thermal level exceeds one or more threshold values; and send instructions to one or more voltage regulators or one or more chiplets of the programmable logic to control thermal levels of the one or more fabric die based on thermal data.

Example Embodiment 19

The programmable logic device package of example embodiment 18, wherein the instructions comprise instructions to move one or more IO lanes of one or more IO chiplets of the one or more chiplets of the one or more interconnected fabric die to a low power state.

Example Embodiment 20

The programmable logic device package of example embodiment 18, wherein the instructions comprise instructions to shut down one or more IO lanes of one or more IO chiplets of the one or more chiplets of the one or more interconnected fabric die.

Example Embodiment 21

The programmable logic device package of example embodiment 18, wherein the instructions comprise instructions to decrease an interface frequency of the one or more interconnected fabric die, and send a communication to central control logic of the programmable logic device package to decrease interface logic traffic, wherein the central control logic comprises one or more processors and a memory.

Example Embodiment 22

The programmable logic device package of example embodiment 18, wherein the instructions comprise lowering a voltage frequency point of one or more accelerator chiplets of the one or more chiplets of the one or more interconnected fabric die.

Example Embodiment 23

The programmable logic device package of example embodiment 18, wherein the instructions comprise instructions to shut down one or more accelerator chiplets of the one or more chiplets of the one or more interconnected fabric die.

Example Embodiment 24

The programmable logic device package of example embodiment 18, wherein the thermal level comprises an average of the thermal parameter from a single thermal sensor over time.

Example Embodiment 25

The programmable logic device package of example embodiment 18, wherein the thermal level comprises an average of the thermal parameters from multiple thermal sensors of the one or more thermal sensors.

Example Embodiment 26

The programmable logic device package of example embodiment 18, wherein the thermal level comprises a peak thermal parameter.

Example Embodiment 27

A programmable logic device package comprising: a plurality of programmable fabric die comprising a plurality of thermal sensors; and control circuitry to: receive thermal data from the plurality of thermal sensors located on the plurality of programmable fabric die; determine a hotspot in a first programmable fabric die using the thermal data; an cause programmable logic implemented in the hotspot to be implemented in a second programmable fabric die by reconfiguring one or more logic blocks from the first programmable fabric die to the second programmable fabric die.

Example Embodiment 28

The programmable logic device package of example embodiment 27, wherein the plurality of programmable fabric die are stacked in a three-dimensional orientation.

Example Embodiment 29

The programmable logic device package of example embodiment 27, wherein one or more thermal management controllers of the plurality of programmable fabric die is configured to send thermal data from the first programmable fabric die to the second programmable fabric die.

Example Embodiment 30

The programmable logic device package of example embodiment 27, wherein the one or more logic blocks within each interconnected fabric die are predefined as part of a modular design that has been previously compiled.

Example Embodiment 31

The programmable logic device package of example embodiment 27, wherein reconfiguring the one or more logic blocks comprises loading the configuration from a configuration memory.

Example Embodiment 32

The programmable logic device package of example embodiment 27, wherein reconfiguring the one or more logic blocks comprises compiling a design for the plurality of programmable die when moving the hotspot from the first programmable fabric die.

What is claimed is:

1. A programmable logic device package comprising:
one or more voltage regulators;
one or more power sensors to measure a power parameter;
one or more interconnected fabric die comprising one or more input/output (IO) chiplets; and
control circuitry to:
receive power data from the one or more power sensors located on the one or more interconnected fabric die;
send instructions to the one or more voltage regulators to control power levels of the programmable logic device package based on the power data; and
determine a power state of the one or more IO chiplets based on bandwidth data based at least in part on the received power data.

2. The programmable logic device package of claim 1, wherein determining the power state comprises determining a number of IO lanes in an active mode, a number of IO lanes in a sleep mode, or numbers of IO lanes in both active modes and in sleep modes.

3. The programmable logic device package of claim 1, wherein the instructions comprise instructions to set one or more sectors of the one or more interconnected fabric die to a lower voltage state based on a determined available bandwidth of the one or more IO chiplets of the programmable logic device package, one or more compute states of one or more accelerator chiplets of the programmable logic device package, or both.

4. The programmable logic device package of claim 1, wherein the control circuitry comprises a control unit die that is coupled to the one or more interconnected fabric die and the one or more voltage regulators.

5. The programmable logic device package of claim 1, wherein the control circuitry comprises control logic implemented in a programmable logic fabric on at least one of the one or more interconnected fabric die.

6. The programmable logic device package of claim 1, wherein the one or more interconnected fabric die comprise one or more accelerator chiplets.

7. The programmable logic device package of claim 1, wherein the control circuitry determines an average power level of the power parameter over time based on the power data.

8. The programmable logic device package of claim 7, wherein the control circuitry determines whether the average power level over time exceeds one or more power thresholds and sends the instructions based at least in part on the average power level exceeding the one or more power thresholds.

9. The programmable logic device package of claim 1, wherein the power parameter comprises a measured current, a measured voltage, or a combination thereof.

10. A programmable logic device package comprising:
one or more voltage regulators;
one or more power sensors to measure a power parameter;
one or more interconnected fabric die;
an accelerator chiplet to aid the one or more interconnected fabric die in performing operations; and
control circuitry to:
receive power data from the one or more power sensors located on the one or more interconnected fabric die;
determine an average power level based on the received power data;
determine the average power level exceeds one or more threshold values; and
send instructions to the one or more voltage regulators of the programmable logic device package to control power levels of the accelerator die based on the power data.

11. The programmable logic device package of claim 10, wherein the power data comprises a power parameter of the programmable logic device package, IO chiplet power data, accelerator chiplet power data for the accelerator chiplet, or any combination thereof.

12. The programmable logic device package of claim 10, wherein the instructions comprise instructions to move one or more IO lanes of one or more IO chiplets of the one or more interconnected fabric die to a low power state.

13. The programmable logic device package of claim 10, wherein the instructions comprise instructions to decrease an interface frequency of the one or more interconnected fabric die.

14. The programmable logic device package of claim 10, wherein the instructions comprise instructions to lower a voltage frequency point of the accelerator chiplet.

15. The programmable logic device package of claim 10, wherein the control circuitry comprises a control unit die that is coupled to the one or more interconnected fabric die and the one or more voltage regulators.

16. A programmable logic device package comprising:
one or more voltage regulators;
one or more power sensors to measure a power parameter;
a plurality of interconnected fabric die including an accelerator chiplet to aid others of the plurality of interconnected fabric die in performing operations; and
control circuitry to:
receive power data from the one or more power sensors located on the plurality of interconnected fabric die;
determine an average power level based on the received power data;
determine the average power level exceeds one or more threshold values; and
send instructions to the one or more voltage regulators of the programmable logic device package to control power levels of the accelerator die based on the power data.

17. The programmable logic device package of claim 16, wherein the power data comprises a power parameter of the programmable logic device package, IO chiplet power data, accelerator chiplet power data for the accelerator chiplet, or any combination thereof.

18. The programmable logic device package of claim 16, wherein the instructions comprise instructions to move one or more IO lanes of one or more IO chiplets of the plurality of interconnected fabric die to a low power state.

19. The programmable logic device package of claim 16, wherein the instructions comprise instructions to decrease an interface frequency of the plurality of interconnected fabric die.

20. The programmable logic device package of claim 16 wherein the instructions comprise instructions to lower a voltage frequency point of the accelerator chiplet.

21. The programmable logic device package of claim 16, wherein the control circuitry comprises a control unit die that is coupled to the plurality of interconnected fabric die and the one or more voltage regulators.

22. A programmable logic device package comprising:
one or more voltage regulators;
one or more power sensors to measure a power parameter;
a plurality of interconnected fabric die comprising one or more input/output (IO) chiplets; and
control circuitry to:
receive power data from the one or more power sensors located on the plurality of interconnected fabric die;
send instructions to the one or more voltage regulators to control power levels of the programmable logic device package based on the power data; and
determine a power state of the one or more IO chiplets based on bandwidth data based at least in part on the received power data.

23. The programmable logic device package of claim 22, wherein the control circuitry determines a power state of the one or more IO chiplets, wherein determining the power state comprises determining a number of IO lanes in an active mode, a number of IO lanes in a sleep mode, or numbers of IO lanes in both active modes and in sleep modes.

24. The programmable logic device package of claim 22, wherein the instructions comprise instructions to set one or more sectors of the plurality of interconnected fabric die to a lower voltage state based on a determined available bandwidth of the one or more IO chiplets of the programmable logic device package, one or more compute states of one or more accelerator chiplets of the programmable logic device package, or both.

25. The programmable logic device package of claim 22, wherein the control circuitry comprises a control unit die that is coupled to the plurality of interconnected fabric die and the one or more voltage regulators.

26. The programmable logic device package of claim 22, wherein the control circuitry comprises control logic implemented in a programmable logic fabric on at least one of the plurality of interconnected fabric die.

27. The programmable logic device package of claim 22, wherein the plurality of interconnected fabric die comprise one or more accelerator chiplets.

28. The programmable logic device package of claim 22, wherein the control circuitry determines an average power level of the power parameter over time based on the power data.

29. The programmable logic device package of claim 28, wherein the control circuitry determines whether the average power level over time exceeds one or more power thresholds and sends the instructions based at least in part on the average power level exceeding the one or more power thresholds.

30. The programmable logic device package of claim 22, wherein the power parameter comprises a measured current, a measured voltage, or a combination thereof.

* * * * *